// United States Patent [15] 3,674,919
Garrett et al. [45] July 4, 1972

[54] DISABLING CIRCUITRY, FOR AUTOMATIC FREQUENCY HUE CONTROL

[72] Inventors: Donald E. Garrett, Chesapeake; Theodore V. Zaloudek, Portsmouth, both of Va.

[73] Assignee: General Electric Company

[22] Filed: Oct. 26, 1970

[21] Appl. No.: 83,828

[52] U.S. Cl. ....................................178/5.4 R, 178/5.4 HE
[51] Int. Cl. ....................................H04n 5/50, H04n 9/12
[58] Field of Search ....................178/5.4 R, 5.4 MC, 5.4 HE, 178/5.4 SD, 5.4 AC

[56] References Cited

UNITED STATES PATENTS 2,896,018 7/1959 Rhodes et al. ....................178/5.8 AF
3,617,621 11/1971 Cochran ..........................178/5.4 HE

OTHER PUBLICATIONS

Electronics World, pp. 30–31, 78, Sept. 1969
Consumer Reports Buying Guide Dec. 1968 pp. 256–257
Electronics Servicing page 58 Dec. 1969
Electronics, pp. 102–105, June 22, 1970
Electronic Servicing, pp. 60–61, July, 1970
Electronics World, pp. 41–45, 72–75, January 1968

*Primary Examiner*—Robert L. Richardson
*Attorney*—James E. Espe, Francis H. Boos, Jr., Frank L. Neuhauser, Oscar B. Waddell and Joseph B. Forman

[57] ABSTRACT

First and second selector switch means are provided for adding or subtracting reactive elements from phase shift circuits which supply chroma signals to the demodulator stages of a color television receiver. First and second disabling switch means are placed in shunt with the reactive elements and associated switch means for disabling the phase shift circuits during fine adjustment of various controls by a viewer. A third disabling switch is provided for removing a bias provided by an automatic frequency control module from the tuner stage of the receiver. All three disabling switches are linked together for simultaneous operation such that tuning and color signal control circuitry is disabled to allow the receiver to be adjusted manually. The disabling switches may then be opened, allowing the automatic frequency control and phase shifting circuits to resume their functions.

5 Claims, 2 Drawing Figures

INVENTORS
DONALD E. GARRETT
& THEODORE V. ZALOUDEK
BY James E. Espe
THEIR ATTORNEY

DISABLING CIRCUITRY, FOR AUTOMATIC FREQUENCY HUE CONTROL

BACKGROUND OF THE INVENTION

The present invention relates to color television receivers and, more particularly, to apparatus for disabling signal compensating means provided within a color television receiver.

It is often desirable to include within color television receiver circuitry additional means for compensating for various tuning errors, unanticipated excursions in signal phase or frequency, and aberrations in color signals which determine the hues of the image displayed upon a cathode ray tube. Other types of circuitry or hue control means may be provided which, rather than compensating for color signal error, suppress certain portions of a color spectrum while accentuating other portions which are considered to be more critical or more susceptible to significant change in hue due to aberrations in received signals. Such means are taught by copending applications Ser. No. 83,934 filed Oct. 26, 1970, invented by Theodore V. Zaloudek and assigned to the assignee of the present invention; and application Ser. No. 84,068, filed Oct. 26, 1970 invented by Robert G. Worden and also assigned to the assignee of the present invention.

In such a system it is desired to provide oppositely directed phase shifts of identical chroma signals which are to be transmitted to demodulating means, for improving the response of the receiver to flesh tones. It is desirable to provide means for simultaneously introducing elements which produce a phase lag of predetermined amount in a first signal path, and, in a second signal path, introducing elements which provide a predetermined phase lead. In order to provide the desired range of phase shift, each phase shift circuit could be provided with a single reactive element whose value may be adjusted; or, a plurality of elements may be provided and selectively combined by use of switching means. When, however, such phase shifting circuits are employed for distorting or modifying the response of the receiver, suppressing signals representing certain portions of the spectrum and accentuating others, the lessened sensitivity of the displayed image to the phase of the detected chroma signals renders the receiver much more difficult to adjust. Satisfactory flesh tones will be produced in the displayed image for a broader range of tuning adjustment than is normally the case, rendering it very difficult for a viewer to accurately judge the point at which the receiver is properly adjusted.

The very fact of the successful operation of the chroma signal phase shifting apparatus makes totally accurate adjustment more difficult to attain, since the response of the receiver to aberrant signals is significantly lessened. Still further, the presence of an automatic frequency control, hereinafter referred to as an AFC, renders fine tuning still more difficult since it tends to cause the receiver to "lock" a received signal despite inaccurate tuning. As will be recognized by those skilled in the art, AFC serves to modify the reactance of certain elements disposed within the tuner of the color television receiver such that changes in the frequency of a received signal are compensated for by corresponding changes in the resonant frequency of the tuner elements, assuring that the tuner will "track" minor excursions in the signal. Optimum tuning is thus rendered quite difficult, since the tuner tends to "lock on" the desired signal as soon as the resonant frequency of the tuner approaches the frequency of the desired signal. The range of fine tuning lying within the compensating capabilities of the AFC thus produces little change in the displayed image, making it very difficult for the operator of the receiver to ascertain when the receiver is accurately tuned.

Thus, it would be desirable to provide means for disabling the various compensating or desensitizing mechanisms to facilitate fine adjustment of the receiver controls.

SUMMARY OF THE INVENTION

It is therefore an object of the present invention to provide means for simultaneously varying the phase shift introduced into a pair of signal paths by predetermined increments.

It is a further object to provide means for simultaneously disabling chroma signal phase shifting means and AFC means so that fine tuning may be facilitated.

Briefly stated, in accordance with one aspect of the present invention, a chroma signal obtained from a bandpass amplifier is applied by means of first and second phase shifting circuits to a pair of synchronous demodulators for obtaining color difference signals. A plurality of predetermined phase shift increments are made available by providing in each phase shift circuit a series of reactive elements to be cumulatively added to the circuit by a pair of mechanically linked, multiple position selector switches. In a first position, the switches serve to connect the bandpass amplifier output directly to an input of each synchronous demodulator, there being no phase difference between the chroma signals so applied. As the switches are advanced to succeeding positions additional reactive elements are engaged such that in an extreme position the full number of available reactive elements are connected in series between the bandpass amplifier and the input terminal of the synchronous demodulator with which each switch communicates. First and second shunting switches bypass the phase shifting circuits such that, when the shunting switches are closed, the chroma signal is applied directly to each demodulator. Chroma signals having a common phase are then demodulated regardless of the position of the selector switches A third shunting switch is provided to shunt a conductor extending between a source of AFC voltage and a tuner to a point of reference potential. When the third shunting switch is closed, AFC voltage, and thus the voltage of a reference point in the tuner, is forced to attain the reference voltage which in the illustrated embodiment is ground potential. This voltage represents the voltage level provided by the AFC when the tuner is receiving signals of the frequency of a selected channel. All three shunting switches are linked together for simultaneous operation such that the chroma phase shift circuits and the AFC are simultaneously disabled, allowing a viewer to subjectively determine when the receiver is properly tuned by assuring a keen response of the receiver to the various tuning controls. After the viewer determines that the receiver is properly adjusted, the three shunting switches are simultaneously opened, reinstituting the AFC voltage and allowing the chroma signals supplied to the demodulators to assume the relative phase angles determined by the setting of the selector switch means.

BRIEF DESCRIPTION OF THE DRAWING

While the specification concludes with claims particularly pointing and distinctly claiming the subject matter which is regarded as the invention, it is believed that the invention will be better understood from the following description of the preferred embodiments taken in connection with the accompanying drawing, in which:

DESCRIPTION OF THE PREFERRED EMBODIMENTS

Figure 1:
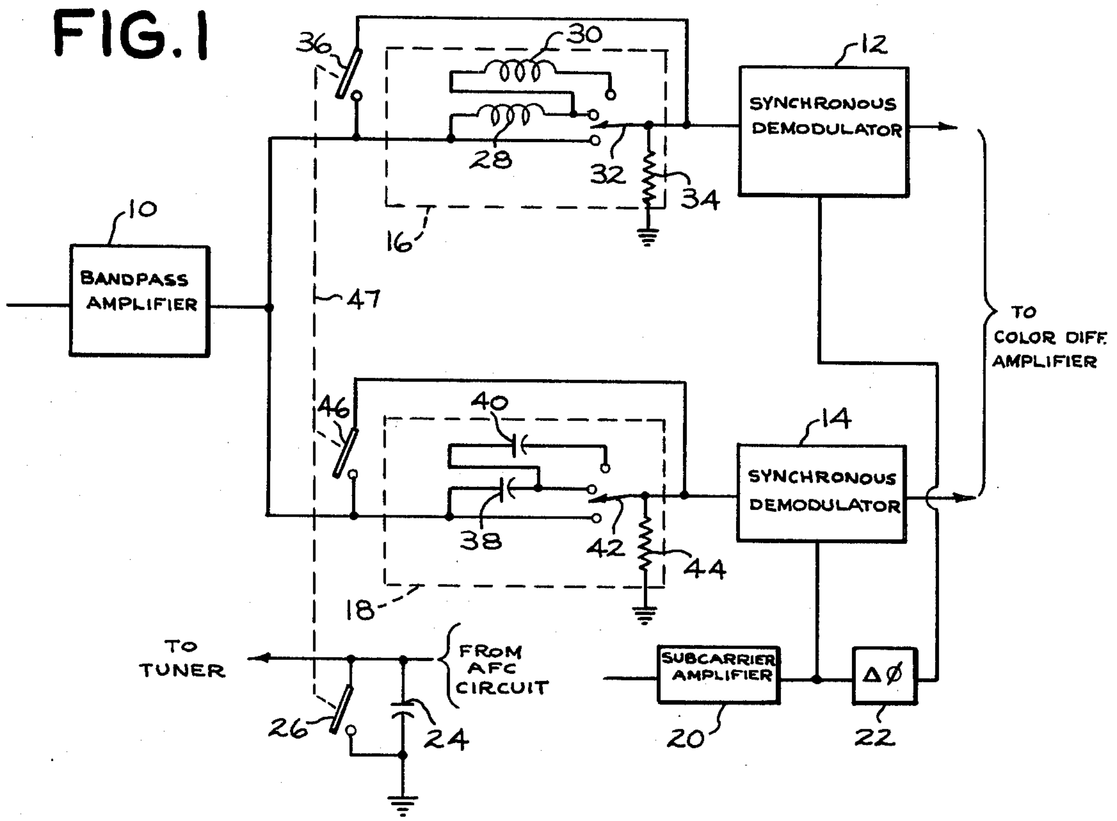
FIG. 1 is a schematic diagram showing selected elements of a color television receiver including phase shift circuits, and showing switch means for circumventing the phase shift circuits and defeating the AFC.

FIG. 1 shows a portion of the demodulating circuitry of a color television receiver including a bandpass amplifier 10 which may transmit chroma information to a pair of synchronous demodulators 12 and 14 by means of a pair of phase shifting circuits generally indicated at 16 and 18. The phase shifting circuits serve to change the phase relationships between the chroma signals received by the two synchronous demodulators 12 and 14 and that outputted by bandpass amplifier 10, and may also change the relative amplitude thereof.

As is taught in the aforementioned applications of Theodore V. Zaloudek and Robert G. Worden, no processing of the signal or extraction of information is accomplished by phase shifting circuits 16 and 18, their function being to cause the chroma signals received by each synchronous-demodulator to vary in phase with respect to a reference signal. The reference signal is provided by a subcarrier amplifier 20 and is kept in synchronization by a burst signal abstracted from the transmitted video signal. Subcarrier phase shifter 22 applies the subcarrier to the synchronous demodulator 12 approximately in quadrature with the signal applied directly from the subcarrier amplifier 20 to the other synchronous demodulator 14. The shifted and unshifted subcarriers synchronously demodulate chroma information which is conveyed by a pair of sine waves combined in quadrature. Also shown in FIG. 1 is a filter capacitor 24 and a switch 26 connected in shunt with a conductor which supplies voltage from an AFC circuit to a tuner. When switch 26 is closed, grounding the line to which 24 is connected, the action of the AFC circuit s defeated.

Phase shifting circuit 16 comprises inductors 28 and 30 which may be connected in series between bandpass amplifier 10 and synchronous demodulator 12 by means of a selector switch 32. Resistor 34 is connected between the chroma-carrying line and ground and combines with the inductors 28 and 30 to form an integrating circuit. The integrating circuit serves to produce a lagging phase relationship between the chroma signal transmitted to demodulator 12 and that received from bandpass amplifier 10. The amount of lag can be varied by changing the value of the inductor. Switch 36 shunts inductors 28 and 30 and selector switch 32, when closed, to pass chroma signals directly from bandpass amplifier 10 to synchronous demodulator 12.

Phase shifting circuit 18 includes capacitors 38 and 40 which may be cumulatively connected in series between bandpass amplifier 10 and synchronous demodulator 14 by selector switch 42 to impart a leading phase relationship to the chroma signal received by demodulator 14. Resistor 44 is connected between the chroma-carrying line and ground and combines with capacitors 38 and 40 to form a differentiating circuit to impart the desired phase lead to the chroma signal depending upon the value of the capacitor. Switch 46 shunts the chroma signal outputted by bandpass amplifier 10 directly to synchronous demodulator 14, when closed, to bypass phase shift circuit 18.

As is taught in the above-mentioned applications of Theodore V. Zaloudek and Robert G. Worden, it has been found that improved control over flesh tone reproduction in the presence of aberrant signals can be obtained by enlarging the demodulation angle. Ordinarily, a fixed phase differential is maintained between the subcarrier signal applied to synchronous demodulator 12 and that applied to demodulator 14, which serve to demodulate signals representing colors falling in the generalized red and blue portions of the color spectrum, respectively. By inducing a phase lag in the chroma signal applied to "red" synchronous demodulator 12 and a phase lead in the chroma information applied to "blue" synchronous demodulator 14, the differential between the phase angles at which the signals are detected in the two demodulators, herein termed the demodulation angle, is increased. Additional phase lag is imparted to the chroma signal transmitted to synchronous demodulator 12 as selector switch 32 is rotated clockwise, causing additional inductive elements to be connected in series between bandpass amplifier 10 and synchronous demodulator 12. Similarly, as additional capacitive elements are serially connected between the bandpass amplifier and synchronous demodulator 14 in response to the clockwise rotation of selector switch 42, additional phase lead is imparted to the chroma signal transmitted thereby, and the detection angle is expanded. Unfortunately, however, the very phenomenon which is provided by the increased demodulation angle, that of progressively decreasing image sensitivity to aberrations in received signals representing flesh tones, makes it difficult for the viewer to ascertain when optimum adjustment of the receiver has been achieved. As selector switches 32 and 42 are rotated so as to engage additional reactive elements and thus enlarge the demodulation angle, the response of the image displayed by the television receiver to changes in the controls is progressively reduced. Similarly, with the AFC unit in operation, the receiver tends to "lock on" a received signal despite changes in the tuner control, thus making it difficult to judge when the tuner is accurately adjusted for optimum AFC operation, i.e., at the center frequency of the AFC's compensating range. For these reasons, switches 26, 36 and 46 are provided to disable the AFC and the chroma phase shifting circuits 16 and 18 of the receiver. Means 47 are provided to gang together switches 26, 36 and 46 such that they may be simultaneously closed for disabling the phase shifting and the AFC circuitry, allowing the receiver to respond strongly to adjustments in the tuning and color controls. After the receiver is adjusted to provide satisfactory sound and image, switches 26, 36 and 46 are reopened, allowing the AFC to operate and reinstituting the chroma phase shift and thus the demodulation angle which has been preselected by means of selector switch means 32 and 42.

Figure 2:
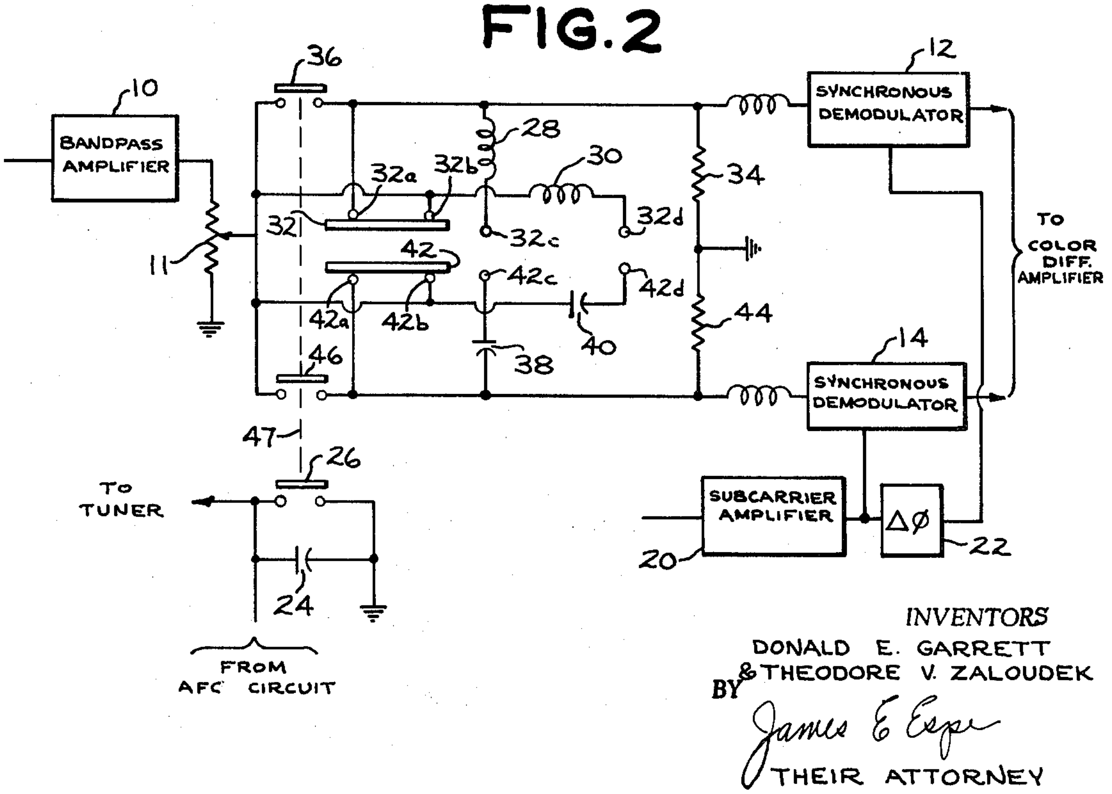
FIG. 2 is a schematic diagram of a further embodiment of the present invention, showing an alternate configuration of the phase shift circuits and associated switching means.

Referring now to FIG. 2, a further embodiment of the present invention is shown, wherein like numbers are utilized to represent elements corresponding to those in FIG. 1. Chroma information is obtained from bandpass amplifier 10 through a potentiometer 11 which serves as a color saturation control, as will be understood by those skilled in the art. A pair of selector switches comprising slidable conductive elements 32 and 42 are mechanically linked and slide transversely to selectively engage contacts **32*a*, 32*b*, 32 *c*, and 32*d* and 42*a*, 42*b*, 42*c* and 42*d*, respectively. In a first position, element 32 engages contacts 32*a* and 32*b*, while element 42 serves to provide a connection between contacts 42*a* and 42*b*. In this orientation, chroma signals derived from potentiometer 11 are transmitted directly to synchronous demodulators 12 and 14 by means of switch elements 32 and 42, bypassing the reactive elements and imparting no relative phase shift to the chroma signal. In a second position, a phase lag is imparted to the chroma information applied to synchronous demodulator 12 due to the presence of inductor 28, and a phase lead imparted to demodulator 14 by capacitor 38**. As explained above, the shift in phase between the chroma signals gives rise to an increased demodulation angle, rendering the flesh tones reproduced by the receiver less susceptible to undesirable variations in hue.

In a third position the switch elements are moved to the extreme right. Element 32 then provides an electrical connection between contacts **32*c* and 32*d*, introducing an additional inductor 30 in series with inductor 28 for increasing total inductance coupled between the bandpass amplifier and synchronous demodulator 12. Similarly, element 42 is now disposed so as to constitute a current path between contacts 42*c* and 42*d*, placing additional capacitor 40 in series with capacitor 38, two capacitors now being series-coupled between bandpass amplifier 10 and synchronous demodulator 14. In this orientation, the maximum available phase lag is imparted to the chroma signal being transmitted to synchronous demodulator 12, while the maximum available phase lead is applied to that chroma signal applied to synchronous demodulator 14**. The demodulation angle is thus at its largest and signals representing colors in the flesh-tone range are accentuated with an accompanying suppression of colors in the magenta and green portions of the spectrum.

With the arrangement thus far described, in order to adjust the receiver to obtain the best image reception, it would be necessary to defeat the AFC system, and move the selector switch members 32 and 42 back to their original position. With the switch members 32 and 42 so orientated, the demodulation angle is at a minimum and the color processing circuitry of the receiver is in its most sensitive mode. However, the present invention further provides a gang switch means 47 which serves to operate shunting switches 26, 36 and 46 to disable the AFC and the chroma phase shift circuits simultaneously. The switch means 47 may advantageously be provided with a pair of manually operated push buttons or the like, one for causing the switches to assume an open position and the other for displacing the switch means in an opposite direction, closing the switches for shunting out the AFC and phase shifters when it is desired to manually adjust the receiver.

While other types of switch means, such as rotary switches, rocker bars and the like may be utilized to perform the switching function, it will now be apparent that the present invention provides means for simultaneously modifying the operation of a pair of phase shifting circuits by selectively engaging discrete reactive components. Further, it will be seen that the invention herein disclosed provides means for manually disabling both the demodulation angle shifting means and the AFC for fine tuning the receiver, while maintaining the demodulation angle setting.

As will be evident from the foregoing description, certain aspects of the invention are not limited to the particular details of construction of the examples illustrated, and it is therefore contemplated that other modifications or applications will occur to those skilled in the art. It is therefore intended that the appended claims shall cover such modifications and applications as do not depart from the true spirit of the invention.

What is claimed as new and desired to be secured by Letters Patent of the United States is:

1. In a color television receiver including automatic frequency control means and further including hue control means for rendering flesh tones in a displayed image insensitive to aberrations in the phase of a received signal, means for simultaneously disabling said automatic frequency control means and said hue control means whereby a more sensitive response of the receiver is permitted in order to facilitate accurate manual adjustment of the receiver

2. In a color television receiver including automatic frequency control means, means for deriving a chroma signal and first and second demodulator means, said receiver further including first phase shifting means for shifting the phase of the chroma signal and for transmitting said signal to said first demodulator, and second phase shifting means for shifting the phase of said chroma signal and for transmitting said signal to said second demodulator:

first switch means for selectively varying the phase shift imparted to said signal by said first and second second phase shifting means; and second switch means for simultaneously disabling said automatic frequency control means and shunting said chroma signal derived from said bandpass amplifier means about said first and second phase shifting means.

3. The invention as defined in claim 2, wherein said first phase shifting means imparts a lagging phase shift to said chroma signal, and said second phase shifting means imparts a leading phase shift to said chroma signal.

4. The invention as defined in claim 3, wherein said first switch means includes a plurality of contacts for selectively connecting inductive means in a series with said first demodulator, and first coupling means for selectively coupling pairs of said contacts; and said switch means further includes a plurality of contacts for selectively connecting capacitive means in series with said second demodulator, and second coupling means for selectively coupling pairs of contacts.

5. The invention as defined in claim 4, wherein said first and second coupling means comprise a pair of spaced conductive elements, and further including means for supporting said elements in spaced relationship for slidable engaging selected pairs of said contacts.

* * * * *